Nov. 26, 1935.                C. G. MAHONEY                2,022,625
                                RODENT TRAP
                             Filed Oct. 8, 1932

Inventor
Charles G. Mahoney
By Lynn H. Latta
Attorney

Patented Nov. 26, 1935

2,022,625

UNITED STATES PATENT OFFICE 2,022,625

RODENT TRAP

Charles G. Mahoney, Sioux City, Iowa, assignor of three-fifths to Buel Couch, Sioux City, Iowa Application October 8, 1932, Serial No. 636,810

1 Claim. (Cl. 43—83)

My invention relates to a rodent or mouse trap of the type which clamps the animal against the base by means of a spring actuated jaw.

An object of my invention is to provide such a trap which will quickly and efficiently trap the animal.

A further object of my invention is to provide such a trap which can be easily set.

A further object of my invention is to provide a trap which will allow removal of the dead body of the rodent without touching the same.

A further object of my invention is to provide means for conveniently setting the trap without danger of snapping of the jaws against the fingers of the hand.

A further object of my invention is to provide a trap of this type which is of an extremely simple construction, has very few parts to get out of order and which can be constructed at a minimum of expense.

With these and other objects in view, my invention consists in the construction, arrangement and combination of the various parts of my device, whereby the objects contemplated are attained, as hereinafter more fully set forth, pointed out in my claim, and illustrated in the accompanying drawing, in which:

Figure 1:
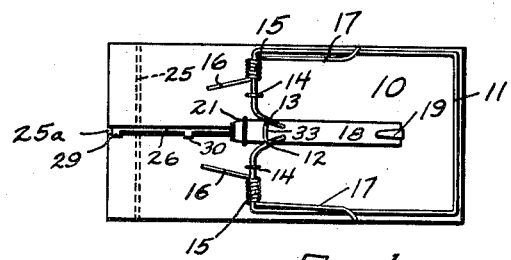
Figure 1 is a plan view of the trap.

I have used the character 10 to designate the wooden base of the trap.

The clamping jaw is formed of an integrally bent piece of wire 11, which is rectangular in shape and terminates in the integral lever member 12.

The lever member 12 terminates in the bent over lip 13. It will be seen that this entire form can be made of one piece of wire secured at one point.

A pair of staples 14 receive the wire as shown, and the springs 15 include the extended portions 16 and 17 to provide a spring clamping action against the wire 11. From this construction it will be seen that the wire frame 11 is pivotally mounted within the staples 14.

The bait receiving member is indicated by the character 18 and includes the bent over lip 19 for securing the bait.

The member 18 terminates at its rear extremity in the upwardly bent lip 20 and staple 21 provides a pivoting action at this point. The member 18 is also bent downwardly at 22.

Figure 3:
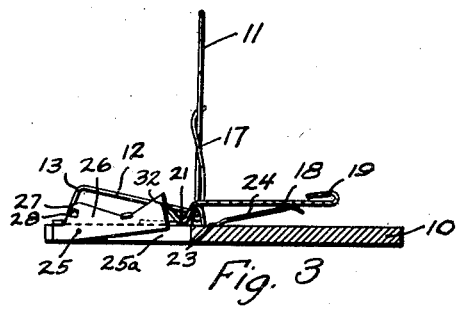
Figure 3 is a sectional view of the side elevation taken medially thereof.
Figure 4:
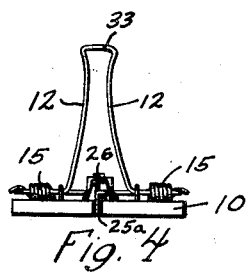
Figure 4 is a rear view of the trap.

Secured at 23 to the base 10 (see Fig. 3) is the small spring wire 24 which normally keeps the member 18 in raised position.

The trigger for actuating the jaws is pivotally mounted on the pin 25, which is merely a small diameter rod which is passed through the base 10 of the trap.

This trigger is arranged to pivot within the slot 25a, which is merely a slot cut lengthwise of the base 10 and is made slightly wider than the trigger itself.

Figure 5:
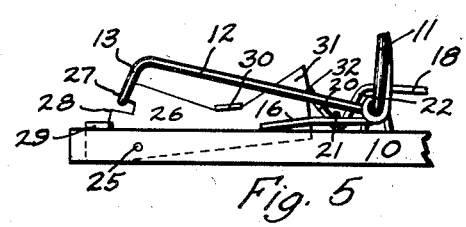
Figure 5 is an enlarged detail view of the trigger mechanism.

The trigger is made of a punched-out piece of flat metal 26 through which the pin 25 passes as shown clearly in Figure 5.

The member 26 includes the upper shoulder 27 and the lower shoulder 28 as well as the bent over lip 29.

The trigger 26 also includes the bent over lip 30. The inner end of the trigger includes the pointed portion 31 and the shoulder 32. I shall now explain how the trap is used.

Figure 6:
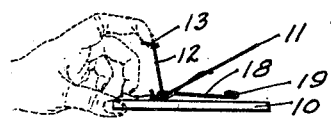
Figure 6 is a view showing the trap being set for use.

In setting, the bait is first placed on the lip 19. The rear of the trap is then grasped by the fingers as shown in Figure 6 with the fore finger placed against the bent over member 13. The fore finger then depresses this member and the jaws 11 of the trap then approach the position shown in Figure 3.

As soon as the end 33 of the member 13 strikes the shoulder 28 in its downward movement, the trigger 26 starts to pivot about the pin 25 and raises the shoulder 32 (see Fig. 3) to the position shown.

Figure 2:
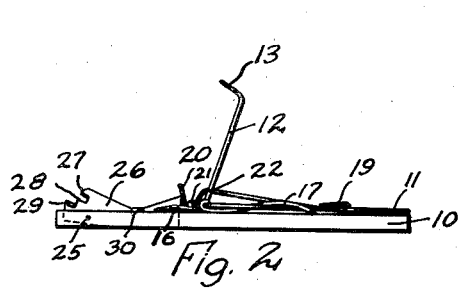
Figure 2 is a side elevation.

Then, as soon as the finger is released from the member 13 the inside of the end 33 is firmly pressed against the shoulder 27 (see Fig. 5). Since the trigger is in the position as shown in Figure 2 when the trap is already sprung, the member 33 will readily pass the upper shoulder 27 in its downward movement.

However as soon as the trigger is in the position as shown in Figure 5 when the member 33 strikes the shoulder 27, it will be held in this position, especially since the shoulder 32 will then be positioned directly above the upwardly bent lip 20 of the member 18.

The upward pressure against the shoulder 27 will tend to maintain the pressure of the shoulder 32 against the end of the lip 20.

It will now be seen as soon as the rodent nibbles at the bait that the lever member 18 will be forced downwardly. As soon as the lever member 18 is forced downwardly the inner shoulder 32 will be released, and the member 33, which is bearing against the shoulder 27 will force the shoulder 27 in an upward direction, thereby causing the end member 31 to drop downwardly and of course at this time the wire jaws 11 will quickly clamp onto the animal.

The bent over lip 30 prevents the trigger mechanism from dropping downwardly too far and likewise the lip 29 accomplishes the same result at the rear of the trigger.

It will be seen that the spring 24 as explained brings the lever member 18 to its open position as soon as the action previously explained takes place.

It will be seen that I have provided a rodent trap which is efficient in operation and which can be set without contaminating the fingers or injuring the fingers and which will also allow removal of the dead animals without touching the same.

It will be also seen that I have provided these characteristics in a device of very few parts, which would tend to eliminate the necessity of replacement of these parts, and that I have also provided such a device which can be made at a very minimum cost.

Some changes may be made in the construction and arrangement of the parts of my invention without departing from the real spirit and purpose of my invention, and it is my intention to cover by my claim any modified forms of structure or use of mechanical equivalents, which may be reasonably included within its scope.

I claim as my invention:

A mouse trap comprising a wooden base having a lengthened slot, a trigger pivotally mounted within the slot, a U shaped spring-urged striking bar pivotally mounted to the base at one end thereof, said striking bar integrally terminating into a double bent portion of limited width at the said pivoted end thereof and arranged substantially at right angles to the striking bar member, to provide a narrow finger piece, said double bent portion including a downwardly bent lip, said trigger including a lower shoulder and an upper shoulder adapted to coact with said lip for setting or releasing purposes by means of said lip being adapted to force the rear of the trigger downwardly when manually depressed against the lower shoulder and said upper shoulder adapted to retain the jaw in open position, said trigger including an inner shoulder, and a bait-receiving lever including an upwardly bent lip positioned to be retained in position by the inner shoulder, said jaw being sprung when the bait-receiving lever is forced downwardly allowing release of the jaw extension from the trigger.

CHARLES G. MAHONEY.